(12) United States Patent
Jheng et al.

(10) Patent No.: US 8,661,917 B2
(45) Date of Patent: Mar. 4, 2014

(54) METHOD FOR MANUFACTURING PIEZORESISTIVE MATERIAL, PIEZORESISTIVE COMPOSITION AND PRESSURE SENSOR DEVICE

(75) Inventors: Li-Cheng Jheng, Kaohsiung (TW); Wen-Yang Chang, Tuku Township, Yunlin County (TW); Kuo-Chen Shih, Kaohsiung (TW); Yi-Lun Hsu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 377 days.

(21) Appl. No.: 13/273,604

(22) Filed: Oct. 14, 2011

(65) Prior Publication Data

US 2012/0090408 A1    Apr. 19, 2012

(30) Foreign Application Priority Data

Oct. 14, 2010 (TW) ............... 99135079 A
Feb. 18, 2011 (TW) ............... 100105509 A
Oct. 13, 2011 (TW) ............... 100137148 A

(51) Int. Cl.
*G01L 1/18* (2006.01)
(52) U.S. Cl.
USPC ................................. 73/862.68
(58) Field of Classification Search
USPC ................................. 73/862.68
See application file for complete search history.

(56) References Cited

U.S. PATENT DOCUMENTS 4,624,796 A * 11/1986 Giniewicz et al. ....... 252/62.9 R
4,765,930 A    8/1988 Mashimo et al.
4,852,581 A    8/1989 Frank
(Continued)

FOREIGN PATENT DOCUMENTS

CN    101260237    9/2008

OTHER PUBLICATIONS

English language translation of abstract of CN 101260237 (published Sep. 10, 2008).
Hussain, M., et al.; "Fabrication Processing and Electrical Behavior of Novel Pressure-Sensitive Composites;" Composites: Part A 32; 2001; pp. 1689-1696.
Luheng, W., et al.; "Effects of Conductive Phase Content on Critical Pressure of Carbon Black Filled Silicone Rubber Composite;" Sensors and Actuators A 135; 2006; pp. 587-592.

(Continued)

*Primary Examiner* — Freddie Kirkland, III
(74) *Attorney, Agent, or Firm* — McClure, Qualey & Rodack, LLP

(57) ABSTRACT

A method for manufacturing a piezoresistive material, a piezoresistive composition and a pressure sensor device are provided. The piezoresistive composition includes a conductive carbon material, a solvent, a dispersive agent, an unsaturated polyester and a crosslinking agent. The conductive carbon material is selected from a group consisting of multi-wall nanotube, single-wall carbon nanotube, carbon nanocapsule, graphene, graphite nanoflake, carbon black, and a combination thereof. The solvent is selected from a group consisting of ethyl acetate, butyl acetate, hexane, propylene glycol mono-methyl ether acetate and a combination thereof. The dispersive agent includes block polymer solution with functional groups providing the affinity. The unsaturated polyester is selected from a group consisting of an ortho-phthalic type unsaturated polyester, an iso-phthalic type unsaturated polyester, and a combination thereof. The crosslinking agent is selected from a group consisting of ethyl methyl ketone peroxide, cyclohexanone diperoxide, dibenzoyl peroxide, tert-butyl peroxybenzoate and a combination thereof.

10 Claims, 6 Drawing Sheets

(56) References Cited

U.S. PATENT DOCUMENTS

| | | | |
|---|---|---|---|
| 5,045,829 | A | 9/1991 | Kuramochi et al. |
| 5,571,973 | A | 11/1996 | Taylot |
| 6,155,120 | A | 12/2000 | Taylor |
| 6,216,545 | B1 | 4/2001 | Taylor |
| 6,543,299 | B2 | 4/2003 | Taylor |
| 7,373,843 | B2 | 5/2008 | Ganapathi et al. |
| 7,553,681 | B2 | 6/2009 | Raravikar et al. |
| 7,811,666 | B2 * | 10/2010 | Dry ............... 428/408 |
| 7,942,072 | B2 * | 5/2011 | Chang et al. ............ 73/862.044 |
| 7,980,144 | B2 * | 7/2011 | Chang et al. ............ 73/862.392 |
| 2008/0170982 | A1 | 7/2008 | Zhang et al. |
| 2008/0286454 | A1 * | 11/2008 | Yamamoto et al. ........... 427/162 |
| 2009/0027280 | A1 | 1/2009 | Frangioni et al. |
| 2010/0098877 | A1 | 4/2010 | Cooper et al. |
| 2012/0065516 | A1 * | 3/2012 | Nishikubo et al. ............ 600/459 |

OTHER PUBLICATIONS

Chen, L., et al.; "Piezoresistive Behavior Study on Finger-Sensing Silicone Rubber/Graphite Nanosheet Nanocomposites;" Advanced Functional Materials; 2007; pp. 898-904.

Dang, Z.M., et al.; "Supersensitive Linear Piezoresistive Property in Carbon Nanotubes/Silicone Rubber Nanocomposites;" Journal of Applied Physics 104; 2008; pp. 024114-1-024114-6.

Battisti, A., et al.; "Percolation Threshold of Carbon Nanotubes Filled Unsaturated Polyesters;" Composites Science and Technology 70; 2010; pp. 633-637.

* cited by examiner

(12)  US 8,661,917 B2

METHOD FOR MANUFACTURING PIEZORESISTIVE MATERIAL, PIEZORESISTIVE COMPOSITION AND PRESSURE SENSOR DEVICE

This application claims the benefits of Taiwan application Serial No. 99135079, filed Oct. 14, 2010, Taiwan application Serial No. 100105509, filed Feb. 18, 2011, and Taiwan application Serial No. 100137148, filed Oct. 13, 2011, the disclosure of which is incorporated by reference herein in its entirety.

BACKGROUND

1. Technical Field

The disclosure relates in general to a method for manufacturing a piezoresistive material, a piezoresistive composition and a pressure sensor device and more particularly to a piezoresistive material manufactured by using an unsaturated polyester.

2. Description of the Related Art

A piezoresistive material can be applied for an electronic component for a sensor such as a pressure sensor, a tactile sensor, a flow sensor, etc. For manufacturing the piezoresistive material, a conductive silicon rubber composite is used. The conductive silicon rubber composite is mainly formed by dispersing micro-scale conductive materials in a silicon rubber based material.

However, the repeatability of the piezoresistive characteristic of the conductive silicon rubber composite is not good. It needs performing cyclic compression for many times for a stable piezoresistive characteristic curve. The successive, cyclic compression treatment increases manufacturing cost and time. In addition, the required response time for the resistance of the conductive silicon rubber composite to reach its steady state is long (>10 sec). It results in a response time delay of the pressure sensor device.

SUMMARY

According to one aspect of the present disclosure, a method for manufacturing a piezoresistive material is provided. The method comprises following steps. A piezoresistive composition is provided. The piezoresistive composition comprises a conductive carbon material, a solvent, a dispersive agent, an unsaturated polyester, and a crosslinking agent. The conductive carbon material is selected from a group consisting of multi-wall carbon nanotubes, single-wall carbon nanotubes, carbon nanocapsules, graphene, graphite nanoflakes, carbon black and a combination thereof. The solvent is selected from a group consisting of ethyl acetate, butyl acetate, hexane, propylene glycol mono-methyl ether acetate and a combination thereof. The dispersive agent comprises an affinity functional groups containing block polymer solution. The crosslinking agent is selected from a group consisting of ethyl methyl ketone peroxide, cyclohexanone diperoxide, dibenzoyl peroxide, tert-butyl peroxybenzoate and a combination thereof. The unsaturated polyester is selected from a group consisting of ortho-phthalic type unsaturated polyester, iso-phthalic type unsaturated polyester and a combination thereof. The conductive carbon material has an amount of 0.1-40 parts by weight relative to 100 parts by a total weight of the unsaturated polyester and the conductive carbon material. The dispersive agent has an amount of 50-70 parts by weight relative to 100 parts by the weight of the conductive carbon material. The crosslinking agent has an amount of 0.1-5 parts by weight relative to 100 parts by the weight of the unsaturated polyester. The solvent has an amount of 10-40 parts by weight relative to 100 parts by the weight of the unsaturated polyester and the solvent. The piezoresistive composition is cured for forming a piezoresistive material.

According to another aspect of the present disclosure, a piezoresistive composition is provided. The piezoresistive composition comprises a conductive carbon material, a solvent, a dispersive agent, an unsaturated polyester, and a crosslinking agent. The conductive carbon material is selected from a group consisting of multi-wall carbon nanotubes, single-wall carbon nanotubes, carbon nanocapsules, graphene, graphite nanoflakes, carbon black and a combination thereof. The solvent is selected from a group consisting of ethyl acetate, butyl acetate, hexane, propylene glycol mono-methyl ether acetate and a combination thereof. The dispersive agent comprises an affinity functional groups containing block polymer solution. In the present disclosure, the unsaturated polyester may be selected from a group consisting of ortho-phthalic type unsaturated polyester, iso-phthalic type unsaturated polyester and a combination thereof. The crosslinking agent is selected from a group consisting of ethyl methyl ketone peroxide, cyclohexanone diperoxide, dibenzoyl peroxide, tert-butyl peroxybenzoate and a combination thereof. The conductive carbon material has an amount of 0.1-40 parts by weight relative to 100 parts by a total weight of the unsaturated polyester and the conductive carbon material. The dispersive agent has an amount of 50-70 parts by weight relative to 100 parts by the weight of the conductive carbon material. The crosslinking agent has an amount of 0.1-5 parts by weight relative to 100 parts by the weight of the unsaturated polyester. The solvent has an amount of 10-40 parts by weight relative to 100 parts by the weight of the unsaturated polyester and the solvent.

According to yet another aspect of the present disclosure, a pressure sensor device is provided. The pressure sensor device comprises a first plate, a second plate and a piezoresistive material. The first plate has a first conductive structure on a surface of which. The second plate has a second conductive structure on a surface of which. The piezoresistive material is electrically connected between the first conductive structure and the second conductive structure. The piezoresistive material is manufactured by the above method.

DETAILED DESCRIPTION

Figure 1:
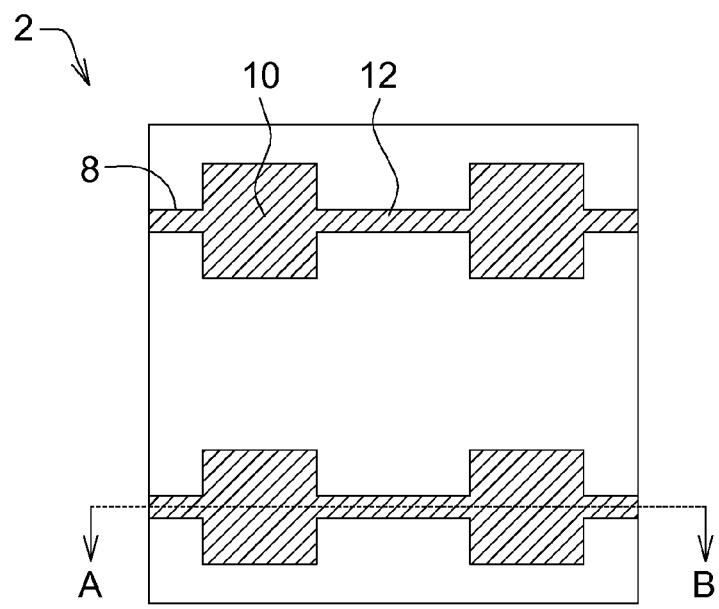
FIG. 1 illustrates a top view of a first plate of a pressure sensor device.

Embodiments of the present disclosure disclose a piezoresistive material. A method for manufacturing the piezoresistive material comprises following steps. A piezoresistive composition is provided. In addition, the piezoresistive composition is cured for forming the piezoresistive material. For example, the piezoresistive composition may be coated onto a substrate and then cured.

The piezoresistive composition comprises a conductive carbon material, a solvent, a dispersive agent, an unsaturated polyester, and a crosslinking agent. The conductive carbon material is uniformly dispersed in the piezoresistive composition. Therefore, the piezoresistive material has good properties such as resistance constancy and piezoresistive repeatability.

The unsaturated polyester may be selected from a group consisting of ortho-phthalic type unsaturated polyester, isophthalic type unsaturated polyester and a combination thereof.

The conductive carbon material may be selected from a group consisting of multi-wall carbon nanotubes, single-wall carbon nanotubes, carbon nanocapsules, graphene, graphite nanoflakes, carbon black and a combination thereof. The conductive carbon material has an amount of 0.1-40 parts by weight relative to 100 parts by a total weight of the unsaturated polyester and the conductive carbon material. In an exemplary embodiment, the conductive carbon material is the multi-wall carbon nanotube or single-wall carbon nanotube having a high aspect ratio (for example, about 1000:1) and thus having a good conductive property and a strong mechanical strength (or tenacity). Therefore, the piezoresistive material with a good conductive property and mechanical strength (or tenacity) can be formed by using a small amount of the multi-wall carbon nanotubes or single-wall carbon nanotubes.

The solvent may be selected from a group consisting of ethyl acetate, butyl acetate, hexane, propylene glycol monomethyl ether acetate and a combination thereof. The solvent has an amount of 10-40 parts, exemplarily 30 parts, by weight relative to 100 parts by the weight of the unsaturated polyester and the solvent. The dispersive agent comprises an affinity functional groups containing block polymer solution. The dispersive agent may comprise, for example, BYK 164 (BYK corporation) or BYKUMEN (BYK corporation). The dispersive agent has an amount of 50-70 parts by weight relative to 100 parts by the weight of the conductive carbon material.

For example, the unsaturated polyester is a material obtained by cross-linking and curing a liquid polyester oligomer or polyester polymer having unsaturated double bond. The structure of the unsaturated polyester may comprise an aromatic structure. The unsaturated polyester does not have thermoplastic property.

The crosslinking agent may be selected from a group consisting of ethyl methyl ketone peroxide, cyclohexanone diperoxide, dibenzoyl peroxide, tert-butyl peroxybenzoate and a combination thereof. The crosslinking agent has an amount of 0.1-5 parts or 0.5-1.5 parts, exemplarily 0.8 parts, by weight relative to 100 parts by the weight of the unsaturated polyester. In some embodiments, the piezoresistive composition may also comprise an accelerating agent that helps the crosslinking agent's function. The accelerating agent may comprise a cobalt based-accelerating agent, such as cobalt naphthenate. The accelerating agent has an amount of 0.1-5 parts or 0.3-1 parts, exemplarily 0.5 parts, by weight relative to 100 parts by the weight of the unsaturated polyester.

A method for uniformly dispersing the conductive carbon material in the piezoresistive composition may comprise, for example, a sonication, a wet grinding, a vigorously mechanical stirring, etc.

In embodiments, the piezoresistive composition is a fluid, and thus can be coated on a substrate by a printing method comprising, for example, a screen printing method or a stencil printing method. The coating method may be adjusted according to a viscosity of the piezoresistive composition. The method of embodiments of the present disclosure may be applied to a roll-to-roll continuous process. The cost is low and the manufacturing speed is high.

The method of embodiments of the present disclosure may be applied to a substrate that has a big area. In addition, the substrate may be flexible such as polyethylene terephthalate (PET), polyethylene naphthalate (PEN), or polyamide (PI). The substrate may also be glass.

A method for curing the piezoresistive composition may comprise, for example, a moisture-initiated crosslinking method, a thermal-initiated crosslinking method, or an UV-initiated crosslinking method. The method may be adjusted according to the unsaturated polyester or the crosslinking agent of the piezoresistive composition.

In embodiments, for example, the piezoresistive composition having a thickness of 0.1 mm~5 mm is disposed in an environment of 15° C.~35° C. for at least 5 minutes, for example 5 minutes-24 hours, or for example 30 minutes for cross-linking the piezoresistive composition. Then the piezoresistive composition is backed by 80° C.~130° C. for removing the solvent so as to form the piezoresistive material. The piezoresistive composition can be cross-linked in an ambient temperature without using an additional heating or cooling system. Thus the manufacture cost is low.

The piezoresistive material belongs to a high surface energy material, and thus has a strong adhesive strength with, for example, the flexible substrate. The piezoresistive material may be applied for a flow sensor, a deformation sensor, etc.

Figure 2:
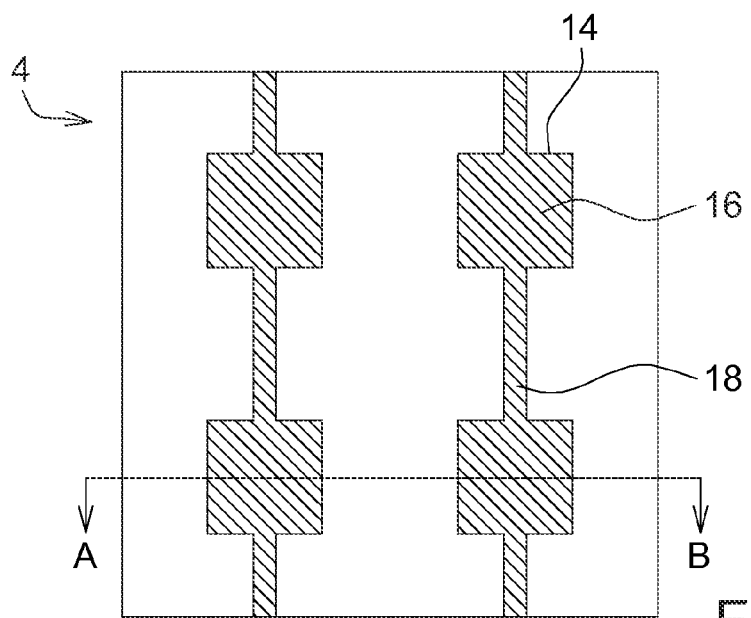
FIG. 2 illustrates a top view of a second plate of a pressure sensor device.
Figure 3:
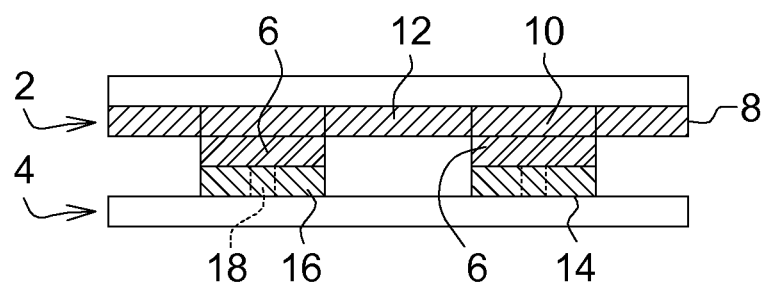
FIG. 3 illustrates a cross-section view of a pressure sensor device.

In embodiments, the piezoresistive material is applied for a pressure sensor device. FIG. 1 illustrates a top view of a first plate 2 of the pressure sensor device. FIG. 2 illustrates a top view of a second plate 4 of the pressure sensor device. FIG. 3 illustrates a cross-section view of the pressure sensor device drawn along AB line of FIG. 1 and FIG. 2.

As shown in figures, the pressure sensor device comprises the first plate 2, the second plate 4 and the piezoresistive material 6. The first plate 2 has a first conductive structure 8 on a surface of which. The first conductive structure 8 may have a first electrode pad 10 and a first trace 12 electrically connected to each other.

The second plate 4 has a second conductive structure 14 on a surface of which. The second conductive structure 14 has a second electrode pad 16 and a second trace 18 electrically connected to each other.

In embodiments, the piezoresistive material 6 is electrically connected between the first electrode pad 10 of the first conductive structure 8 and the electrode pad 16 of the second conductive structure 14. In detail, for example, the piezoresistive material 6, the first electrode pad 10 and the electrode pad 16 overlap.

In one embodiment, the first trace 12 and the second trace 18 are arranged to be perpendicular to each other. However, the present disclosure is not limited to this. In other embodiments, for example, the first trace 12 and the second trace 18 are arranged to be parallel to each other. In some embodiments, the trace is designed to have other kinds of multi-layer structure such as a three-layer structure.

The advantages of the present disclosure are illustrated with the following examples of the present disclosure and comparative examples.

Preparing Piezoresistive Material

EXAMPLE

Unsaturated Polyester Based Piezoresistive Material

A mixture comprising 0.609 g multi-wall carbon nanotubes, 21.866 g butyl acetate solvent, and 0.365 g BYK/164 (BYK corporation) dispersive agent are well mixed for 1 hour by a vigorously mechanical stirring for uniformly dispersing the multi-wall carbon tubes for forming a carbon material containing suspension solution. The multi-wall carbon tubes are uniformly dispersed in the carbon material containing suspension solution. 40 g liquid ortho-phthalic type unsaturated polyester (Changhung/ETERSET 2740P) and the carbon material containing suspension solution are uniformly mixed at a stirring speed of 600 rpm for 6 hours by a high-torque mechanical stirrer for forming a mixture solution. Before coating, a coating composition is formed by uniformly stirring 0.325 g ethyl methyl ketone peroxide (MEKPO) (crosslinking agent), 0.203 g cobalt naphthenate accelerating agent, and the mixture solution.

Next, the coating composition having a thickness of about 0.5 mm is coated on a flexible PET by a stencil printing method. Next, the coating composition is cured by crosslinking at the room temperature of 15° C.~35° C. for 30 minutes. Next, the crosslinked coating composition is baked at 80 for removing the butyl acetate solvent for forming a piezoresistive material.

COMPARATIVE EXAMPLE

Silicon Rubber Based Piezoresistive Material

A mixture comprising 1.316 g multi-wall carbon nanotubes, 2.78 g butyl acetate solvent, 0.790 g BYK/164 (BYK corporation) dispersive agent, and 25 g two-component type thermal-initiated crosslinking liquid silicon rubber A (Dow Corning/SOR6500A) are uniformly mixed at a stirring speed of 600 rpm for 6 hours by a high-torque mechanical stirrer for forming a mixture solution A. In the meantime, a mixture comprising 1.316 g multi-wall carbon nanotubes, 2.78 g butyl acetate solvent, 0.790 g BYK/164 dispersive agent, and 25 g two-component type thermal-initiated crosslinking liquid silicon rubber B (Dow Corning/SOR6500B) are uniformly mixed at a stirring speed of 600 rpm for 6 hours by a high-torque mechanical stirrer for forming a mixture solution B. Before coating, a coating composition is formed by uniformly stirring the mixture solution A and the mixture solution B with a ratio of 1:1.

Next, the coating composition having a thickness of 0.5 mm is coated on a flexible PET by a stencil printing method. Next, the coating composition is cured by crosslinking and the butyl acetate solvent of which is removed at 120 for 10 minutes for forming a piezoresistive material.

Pressure Sensor Device

In the embodiment, the pressure sensor device as shown in FIG. 1 to FIG. 3 is used. The first plate 2 and the second plate 4 are both constructed from a polyimide (PI) copper foil laminate. The first conductive structure 8 and the second conductive structure 14 are formed by patterning the copper foil by an etching process. The piezoresistive material 6 is formed by coating the piezoresistive composition onto the first electrode pad 10 of the first conductive structure 8 by a stencil printing method, and then curing the piezoresistive composition.

Equipment for testing the pressure sensor device is constructed with a force measurement gauges, a LCR meter, and a six-axis micro platform. A test is performed by contacting a single pixel with a cylindrical rod. The bottom end of the cylindrical rod is flat. The force measurement gauges used a continuous force-sensing mode. A resistance of the pressure sensor device is measured by the LCR meter using a frequency of 1 kHz.

Figure 4:
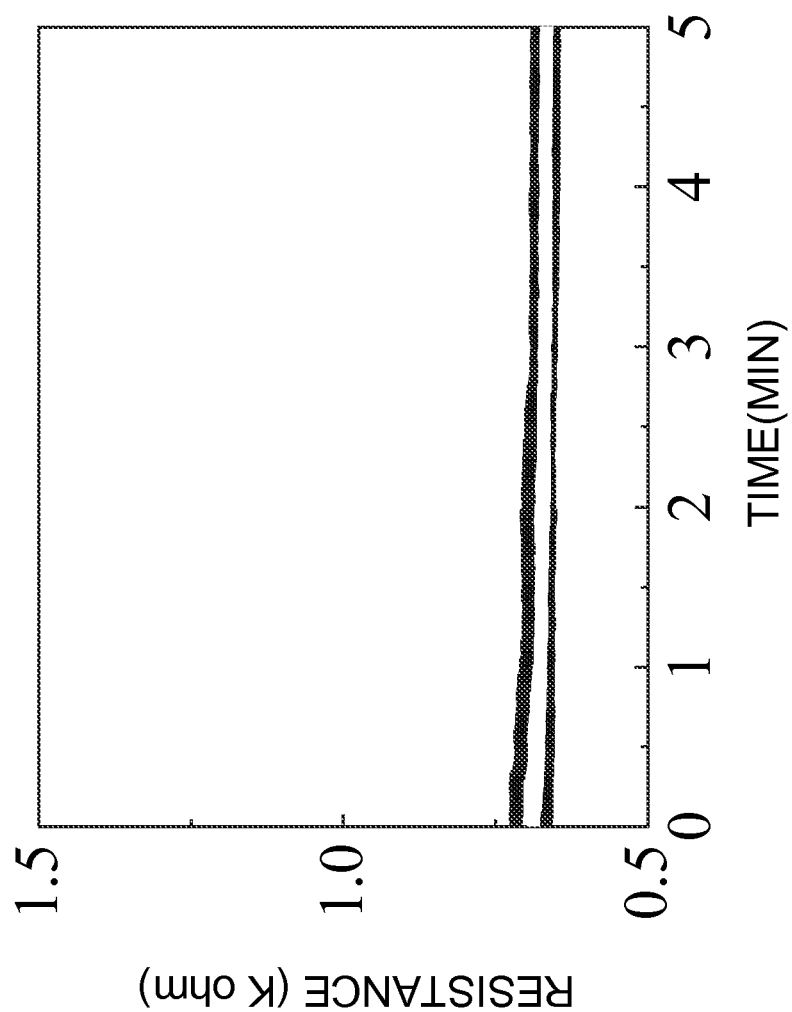
FIG. 4 shows a time-resistance relation of a pressure sensor device measured by the test equipment.
Figure 5:
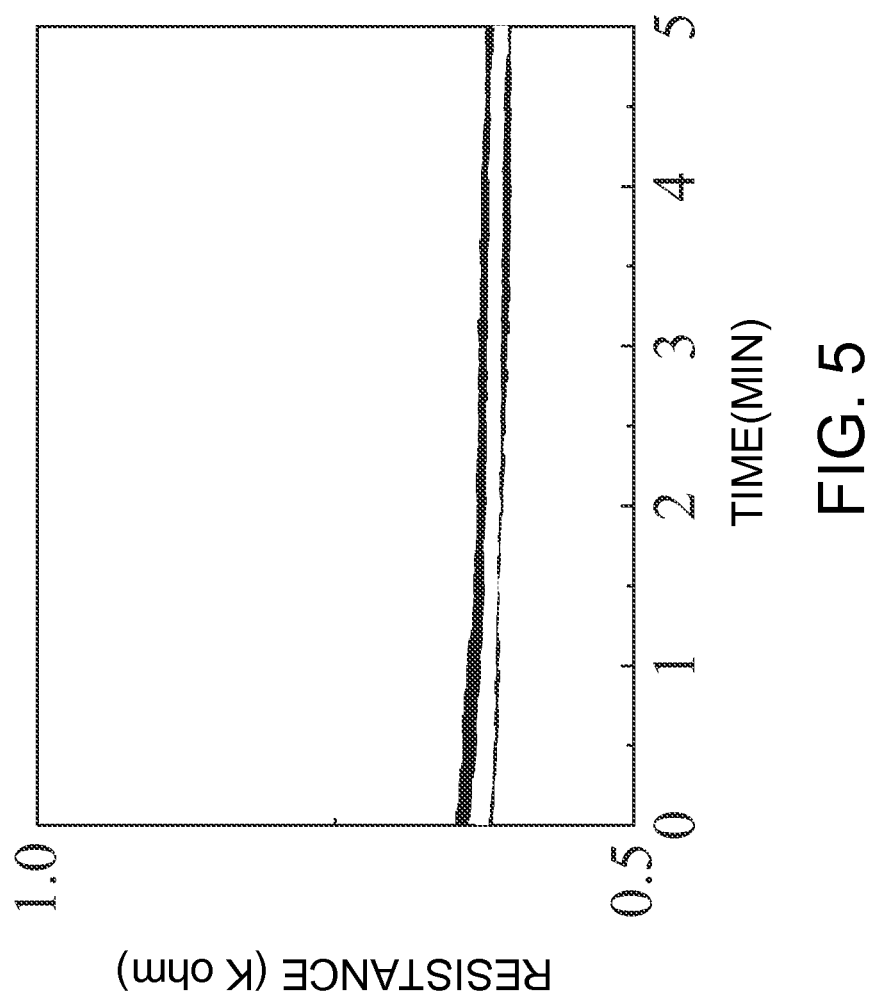
FIG. 5 shows a time-resistance relation of the pressure sensor device using the piezoresistive material of Example as a main body measured by the test equipment.

FIG. 4 and FIG. 5 respectively show time-resistance relations of the pressure sensor device using the unsaturated polyester based piezoresistive material (Example) as a main body measured by applying 10N and 15N for three times repeatedly by the test equipment. From the results of FIG. 4 and FIG. 5, it is found that the response time of the pressure sensor device, defined as the required time to reach the steady state, is extremely short, and the resistance exhibits an equilibrium state. The resistance does not change much under the same force applied at different times. It indicates the pressure sensor device has fast response speed and good resistance constancy. Thus, the pressure sensor device is suitable for applications.

Figure 6:
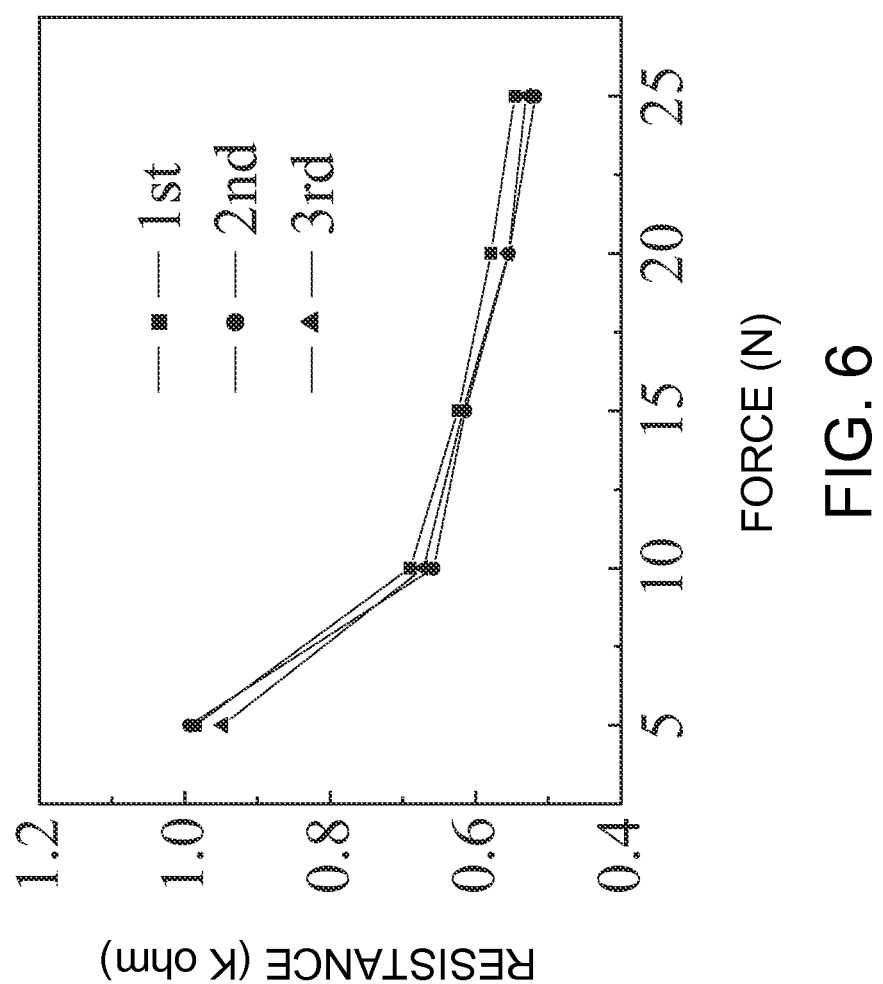
FIG. 6 illustrates resistance change of the pressure sensor device using the piezoresistive material as a function of applied force of Example as a main body measured by the test equipment.

FIG. 6 illustrates a force-resistance relation of the pressure sensor device using the unsaturated polyester based piezoresistive material (Example) as a main body measured by applying different forces repeatedly by the test equipment. From the result of FIG. 6, it is found that the pressure sensor device has a good characteristic curve of force to resistance and repeatability.

Figure 7:
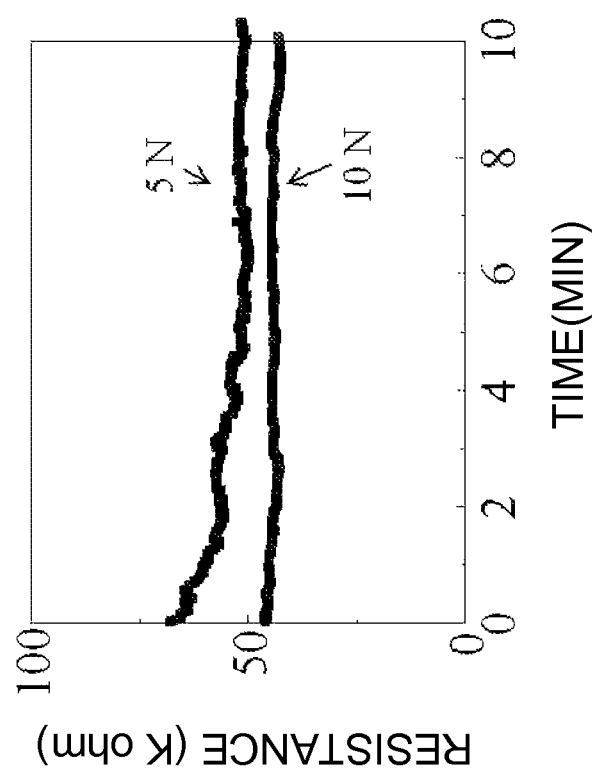
FIG. 7 illustrates a time-resistance relation of the pressure sensor device using the silicon rubber piezoresistive material (Comparative example) as a main body measured by the test equipment.

FIG. 7 illustrates a time-resistance relation of the pressure sensor device using the silicon rubber based piezoresistive material (Comparative example) as a main body measured by applying 5N and 10N by the test equipment. From the result of FIG. 7, it is found that the resistance of the pressure sensor device needs a long time for reaching the steady state. The resistance is relatively not stable, especially when a low force is applied.

The piezoresistive material has the conductive carbon material uniformly dispersed therein, and thus has a good resistance constancy and piezoresistive repeatability. As the conductive carbon material is the carbon nanotubes, the piezoresistive material, using even a small amount of carbon nanotubes, can have a good conductive property and mechanical strength (tenacity). The piezoresistive composition using the unsaturated polyester has a liquid phase at room temperature, and thus the conductive carbon material can be uniformly mixed therein at room temperature. In addition, the unsaturated polyester is a cheap material. Therefore, the manufacturing cost for the piezoresistive material can be reduced.

The piezoresistive composition is a fluid, and thus can be coated on the substrate by a printing method and applied in a roll-to-roll continuous process. The cost is low and the manufacturing speed is high. In addition, the piezoresistive composition can be applied for a big area process. Moreover, the piezoresistive material is a high surface energy material, and thus has a strong adhesive strength with the flexible substrate having a high surface energy, such as PET, PEN or PI, or a glass.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a piezoresistive material, comprising:
   providing a piezoresistive composition comprising:
   a conductive carbon material selected from a group consisting of multi-wall carbon nanotubes, single-wall carbon nanotubes, carbon nanocapsules, graphene, graphite nanoflakes, carbon black and a combination thereof;
   a solvent selected from a group consisting of ethyl acetate, butyl acetate, hexane, propylene glycol mono-methyl ether acetate and a combination thereof;
   a dispersive agent comprising an affinity functional groups containing block polymer solution;
   an unsaturated polyester selected from a group consisting of ortho-phthalic type unsaturated polyester, iso-phthalic type unsaturated polyester and a combination thereof; and
   a crosslinking agent selected from a group consisting of ethyl methyl ketone peroxide, cyclohexanone diperoxide, dibenzoyl peroxide, tert-butyl peroxybenzoate and a combination thereof,
   wherein the conductive carbon material has an amount of 0.1-40 parts by weight relative to 100 parts by a total weight of the unsaturated polyester and the conductive carbon material, the dispersive agent has an amount of 50-70 parts by weight relative to 100 parts by the weight of the conductive carbon material, the crosslinking agent has an amount of 0.1-5 parts by weight relative to 100 parts by the weight of the unsaturated polyester, the solvent has an amount of 10-40 parts by weight relative to 100 parts by the weight of the unsaturated polyester and the solvent; and
   curing the piezoresistive composition for forming a piezoresistive material.

2. The method for manufacturing the piezoresistive material according to claim 1, wherein the piezoresistive composition has a thickness of 0.1 mm~5 mm.

3. The method for manufacturing the piezoresistive material according to claim 1, wherein the piezoresistive composition further comprises an accelerating agent, the accelerating agent has an amount of 0.1-5 parts by weight relative to 100 parts by the weight of the unsaturated polyester.

4. The method for manufacturing the piezoresistive material according to claim 3, wherein the accelerating agent comprises a cobalt based-accelerating agent.

5. The method for manufacturing the piezoresistive material according to claim 1, a method for curing the piezoresistive composition comprises a moisture-initiated crosslinking method, a thermal-initiated crosslinking method, or an UV-initiated crosslinking method.

6. The method for manufacturing the piezoresistive material according to claim 1, a method for curing the piezoresistive composition comprises disposing the piezoresistive composition in an environment of 15° C.~35° C. for 5 mins-24 hours and then backing the piezoresistive composition by 80° C.~130° C. for forming the piezoresistive material.

7. A pressure sensor device, comprising:
   a first plate having a first conductive structure on a surface of which;
   a second plate having a second conductive structure on a surface of which; and
   a piezoresistive material electrically connected between the first conductive structure and the second conductive structure, wherein the piezoresistive material is manufactured by the method according to one of claims 1-6.

8. A piezoresistive composition, comprising:
   a conductive carbon material selected from a group consisting of multi-wall carbon nanotubes, single-wall carbon nanotubes, carbon nanocapsules, graphene, graphite nanoflakes, carbon black and a combination thereof;
   a solvent selected from a group consisting of ethyl acetate, butyl acetate, hexane, propylene glycol mono-methyl ether acetate and a combination thereof;
   a dispersive agent comprising an affinity functional groups containing block polymer solution;
   an unsaturated polyester selected from a group consisting of ortho-phthalic type unsaturated polyester, iso-phthalic type unsaturated polyester and a combination thereof; and
   a crosslinking agent selected from a group consisting of ethyl methyl ketone peroxide, cyclohexanone diperoxide, dibenzoyl peroxide, tert-butyl peroxybenzoate and a combination thereof,
   wherein the conductive carbon material has an amount of 0.1-40 parts by weight relative to 100 parts by a total weight of the unsaturated polyester and the conductive carbon material, the dispersive agent has an amount of 50-70 parts by weight relative to 100 parts by the weight of the conductive carbon material, the crosslinking agent has an amount of 0.1-5 parts by weight relative to 100 parts by the weight of the unsaturated polyester, the solvent has an amount of 10-40 parts by weight relative to 100 parts by the weight of the unsaturated polyester and the solvent.

9. The piezoresistive composition according to claim 8, further comprising an accelerating agent.

10. The piezoresistive composition according to claim 9, wherein the accelerating agent has an amount of 0.1-5 parts by weight relative to 100 parts by the weight of the unsaturated polyester.

* * * * *